[47.]
MADISON THORP.
Improvement in Corn Harvesters.
No. 118,984.     *Fig. 1.*     Patented Sep. 12, 1871.
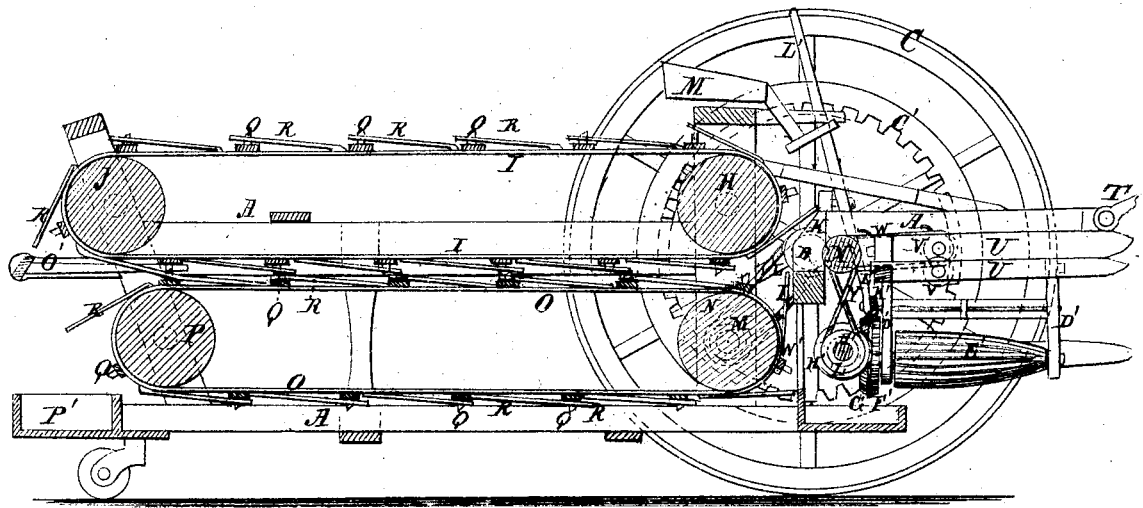
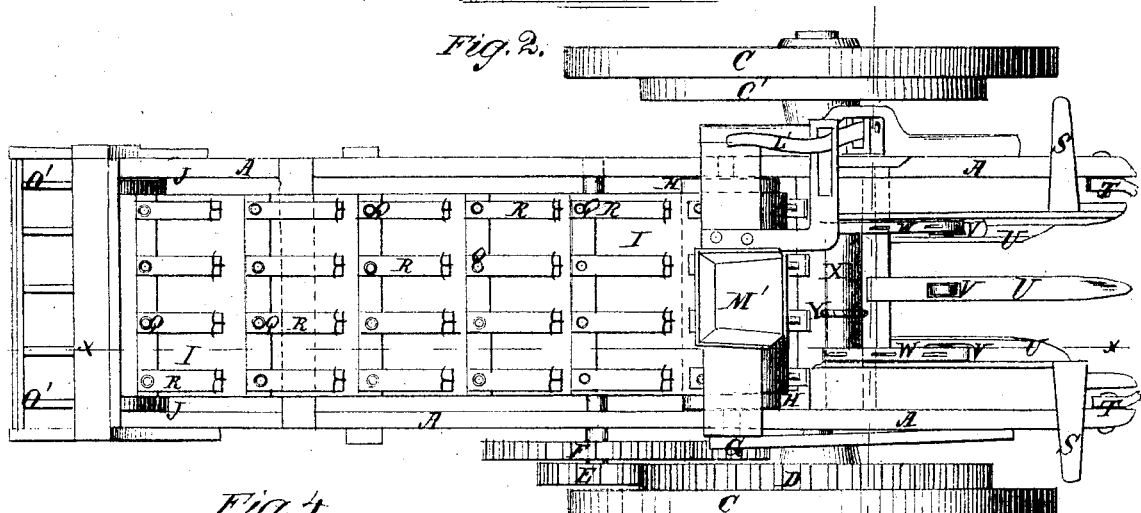
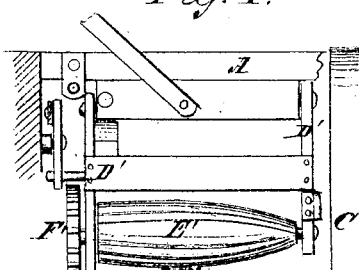
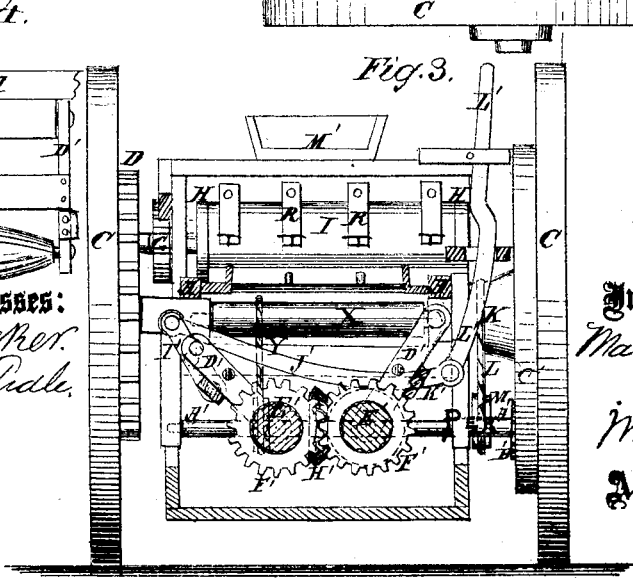
Witnesses:
John Becker
Francis McArdle
Inventor:
Madison Thorp
per [signature]
Attorneys.

UNITED STATES PATENT OFFICE.

MADISON THORP, OF WATERLOO, IOWA.

IMPROVEMENT IN CORN-HARVESTERS.

Specification forming part of Letters Patent No. 118,984, dated September 12, 1871.

*To all whom it may concern:*

Be it known that I, MADISON THORP, of Waterloo, in the county of Black Hawk and State of Iowa, have invented a new and useful Improvement in Corn-Puller and Husker; and I do hereby declare that the following is a full, clear, and exact description thereof, which will enable others skilled in the art to make and use the same, reference being had to the accompanying drawing forming part of this specification.

Figure 1 is a vertical longitudinal section of my improved machine taken through the line $x$ $x$, Fig. 2. Fig. 2 is a top view of the same. Fig. 3 is a detail vertical section of the same taken through the line $y$ $y$, Fig. 2. Fig. 4 is a detail view of one of the cones.

Similar letters of reference indicate corresponding parts.

My invention has for its object to furnish an improved machine for pulling and husking the ears of corn from stalks standing in the field, and which shall be convenient in use and effective in operation; and it consists in the construction and combination of the various parts of the machine as hereinafter more fully described.

A is the frame of the machine, to the forward part of the upper-side bars of which is attached the axle B, the middle part of which is cut away or is made with a downward bend, that it may not interfere with the rearward passage of the ears of corn. C are the wheels which revolve upon the journals of the axle B. To the inner side of one of the wheels C is attached an externally-toothed gear-wheel, D, into the teeth of which mesh the teeth of the small gear-wheel E attached to or revolving upon a shaft working in bearings attached to the frame A. With the small gear-wheel E is rigidly connected a large gear-wheel, F, the teeth of which mesh into the teeth of a small gear-wheel, G, attached to the journal of the roller H that carries the endless belt I, which belt also passes around the roller J pivoted to the rear part of the frame A. To the inner end of the hub of one of the wheels C is attached or upon it is formed a pulley, K, around which passes a band, L, which also passes around a pulley, M, attached to the journal of the roller N, which is pivoted to the lower forward part of the frame A, and around which passes an endless belt, O, which also passes around a roller, P, pivoted to the rear lower part of the frame A.

The rollers H J N P are so arranged that the lower part of the upper belt I and the upper part of the lower belt O may be parallel with each other, and at such a distance apart as only to allow the ears of corn to pass between them. To the belts I O or to cross-bars attached to said belts are attached teeth Q. To the belts I O in front of the teeth Q are attached the forward ends of narrow plates R, through holes in the rear parts of which pass the teeth Q, which plates, as the belts pass around the rollers, rise from the teeth, and thus clear them of any husks that might be adhering to them. The upper-side bars of the frame A project in front of the axle B, and to their forward ends are attached the doubletree or draft-bars S. To the forwardly-projecting ends of the upper-side bars of the frame A is also pivoted the forked rear end of the tongue T, the rear part of which is curved upward to pass over the stalks of corn without breaking them down. With the forwardly-projecting part of the frame A are connected three fingers or teeth, U, which should be arranged parallel with each other and at such a distance apart as to allow the cornstalks, but not the ears of corn, to be drawn through between the said fingers or teeth. The fingers or teeth U should be adjustable, so that they may be adjusted at a greater or less distance apart, according to the size of the corn-stalks. In a slot in each of the fingers or teeth U is pivoted a pulley, V, around which passes a toothed belt, W, which also passes around the roller X, and which are designed to carry the ears of corn back and deliver them to the husking-belts I O. Around the roller X passes a band, Y, which is crossed and passes around a pulley, Z, attached to the shaft A′, which revolves in bearings in arms attached to the forward part of the frame A. To the end of the shaft A′ is attached a small gear-wheel, B′, the teeth of which mesh into the teeth of the internally-toothed gearwheel C′ attached to one of the drive-wheels C. To the forwardly-projecting part of the frame A are pivoted two frames, D′, to the lower parts of which are pivoted the journals of two conical rollers, E′, so that the said conical rollers may be moved toward each other to grasp any stalks that may be drawn from the ground and draw them down through the teeth or fingers U. To the rear or larger ends of the conical rollers E′ are attached gear-wheels F′, the teeth of which, when the said rollers are moved toward each other, mesh into each other, so that one of said rollers may be revolved from the other. To the rear journal of one of the conical rollers E' is attached a small bevel-gear wheel, G, the teeth of which, when the said rollers are moved toward each other mesh into the teeth of a small bevel-gear wheel, H', attached to the shaft A'. To one of the swinging frames D' is attached an arm, I', to the outer end of which is pivoted the end of a bar, J', the other end of which is pivoted to the other frame, to which other frame is attached an arm, K', to the outer end of which is pivoted the lower end of the lever L', which is pivoted to a support attached to the frame A. The upper end of the lever L' projects into such a position that it may be conveniently reached and operated by the driver from his seat M', which is supported from the forward part of the frame A. N' is a rack placed in front of the forward end of the lower belt O to stop the husks that may be carried forward by said belt and cause them to fall to the ground. O' is a rack attached to arms projecting from the rear end of the frame A. The rack O' projects between the rear parts of the belts I O to receive the husks carried back by the belt I and drop them at the rear end of the machine. To the lower part of the rear end of the frame A, beneath the rack O', is attached a box, P', to receive the husked corn as it passes out from between the husking-belts I O.

It should be observed that the gearing that drives the belts I O is so arranged that the lower part of the upper belt I may move rapidly to the rearward, carrying the corn with it, while the upper part of the lower belt O moves forward with only sufficient rapidity to clear the teeth of the husks.

Having thus described my invention, what I claim as new, and desire to secure by Letters Patent, is—

1. The husking-belts I Q R and O Q R and rollers H J and N P, constructed and arranged in connection with each other and with the fingers or teeth U and frame A, substantially as herein shown and described, and for the purpose set forth.

2. The cleaner-plates R, in combination with the teeth Q, belts I O, and rollers H J N P, substantially as herein shown and described, and for the purpose set forth.

3. The combination of the fingers or teeth U, pulleys V, bands W, and roller X with the frame A and husking-belts I Q R and O Q R, substantially as herein shown and described, and for the purpose set forth.

4. The combination of the pivoted or swinging frame D' and conical rollers E' with the fingers or teeth U and frame A, substantially as herein shown and described, and for the purpose set forth.

MADISON THORP.

Witnesses:
 LORE ALFORD,
 B. A. HOLMES.